US010221100B2

(12) United States Patent
Intorcia et al.

(10) Patent No.: US 10,221,100 B2
(45) Date of Patent: Mar. 5, 2019

(54) POURABLE COMPOSITIONS

(71) Applicant: UNITED STATES GYPSUM COMPANY, Chicago, IL (US)

(72) Inventors: Michael Intorcia, Smyrna, TN (US); Dennis Lettkeman, Watonga, OK (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/616,890

(22) Filed: Jun. 7, 2017

(65) Prior Publication Data
US 2017/0349492 A1 Dec. 7, 2017

Related U.S. Application Data

(60) Provisional application No. 62/347,045, filed on Jun. 7, 2016.

(51) Int. Cl.
| | | |
|---|---|---|
| C04B 7/02 | (2006.01) | |
| E04H 3/24 | (2006.01) | |
| C04B 11/30 | (2006.01) | |
| C04B 28/14 | (2006.01) | |
| C04B 24/02 | (2006.01) | |
| C04B 24/12 | (2006.01) | |
| C04B 24/16 | (2006.01) | |
| C04B 103/12 | (2006.01) | |
| C04B 103/40 | (2006.01) | |
| C04B 111/54 | (2006.01) | |
| C04B 111/00 | (2006.01) | |

(52) U.S. Cl.
CPC .............. *C04B 28/14* (2013.01); *C04B 11/30* (2013.01); *C04B 24/023* (2013.01); *C04B 24/12* (2013.01); *C04B 24/16* (2013.01); *E04H 3/24* (2013.01); *C04B 2103/12* (2013.01); *C04B 2103/40* (2013.01); *C04B 2111/00956* (2013.01); *C04B 2111/54* (2013.01); *C04B 2111/542* (2013.01)

(58) Field of Classification Search
CPC ....... C04B 24/12; C04B 24/023; C04B 24/16; C04B 24/121; C04B 28/14; C04B 7/02; C04B 11/30; C04B 2103/12; C04B 2103/20; C04B 2103/40; C04B 2103/402; C04B 2103/406; C04B 2111/00956; C04B 2111/54; C04B 2111/542
See application file for complete search history.

(56) References Cited

U.S. PATENT DOCUMENTS

| | | | |
|---|---|---|---|
| 2,494,403 A | 1/1950 | Nies et al. | |
| 3,372,040 A * | 3/1968 | Ware | C04B 22/16 106/18.11 |
| 3,502,490 A * | 3/1970 | Ware | C04B 28/14 106/18.2 |
| 6,613,424 B1 * | 9/2003 | Putt | B32B 13/04 428/312.4 |
| 6,805,741 B1 | 10/2004 | Liu et al. | |
| 7,338,990 B2 | 3/2008 | Lettkeman et al. | |
| 7,504,165 B2 | 3/2009 | Lettkeman et al. | |
| 7,516,909 B2 | 4/2009 | Kaligian, II et al. | |
| 7,572,328 B2 | 8/2009 | Lettkeman et al. | |
| 7,572,329 B2 | 8/2009 | Liu et al. | |
| 7,608,347 B2 | 10/2009 | Lettkeman et al. | |
| 7,718,019 B2 | 5/2010 | Wittbold et al. | |
| 7,754,007 B2 | 7/2010 | Lettkeman et al. | |
| 7,776,462 B2 | 8/2010 | Liu et al. | |
| 7,932,308 B2 | 4/2011 | Lettkeman et al. | |
| 8,343,273 B1 | 1/2013 | Lettkeman et al. | |
| 9,346,996 B1 | 5/2016 | Lettkeman et al. | |
| 9,708,220 B2 | 7/2017 | Lettkeman et al. | |
| 2004/0028956 A1 * | 2/2004 | Savoly | B28B 19/0092 428/703 |
| 2004/0031421 A1 * | 2/2004 | Delee | A61K 6/0625 106/772 |
| 2006/0278127 A1 | 12/2006 | Liu et al. | |
| 2006/0280898 A1 | 12/2006 | Lettkeman et al. | |
| 2006/0280899 A1 | 12/2006 | Liu et al. | |
| 2015/0315081 A1 | 11/2015 | Lettkeman et al. | |
| 2016/0031761 A1 * | 2/2016 | Munie | E04C 2/04 106/678 |
| 2016/0107931 A1 | 4/2016 | Lettkeman et al. | |
| 2016/0375651 A1 * | 12/2016 | Li | B32B 7/02 428/213 |

FOREIGN PATENT DOCUMENTS

| | | |
|---|---|---|
| GB | 2026465 A | 2/1980 |
| JP | 60-21878 A1 * | 2/1985 |

OTHER PUBLICATIONS

STEOL CS-230 MSDS, Stepan Company, Jan. 25, 2016.*
Polystep B-25 MSDS, Stepan Company, Oct. 14, 2015.*
Bazelova et al., The effect of surface active substance concentration on the properties of foamed and non-foamed gypsum, Ceramics—Silikaty, pp. 379-385 (2010).
International Application No. PCT/US2017/036446, International Search Report and Written Opinion, dated Oct. 6, 2017.
Chemical Service, Inc., "Sodium dibutyl naphthalene sulfonate (Rhodacal® BX-78)," Material Safety Data Sheet, Catalog No. NG-S441 (Apr. 28, 2011).
Columbus Chemical Industries, Inc., "Calsoft F-90," Safety Data Sheet, Product No. 1232 (Rev. Feb. 18, 2013).
G E O Specialty Chemicals. (2013). "Daxad® 19: High Molecular Weight Polynaphthalene Sulfonate, Sodium Salt," Product Bulletin (Sep. 15, 2013).

(Continued)

*Primary Examiner* — Anthony J Green
(74) *Attorney, Agent, or Firm* — Marshall, Gerstein & Borun LLP

(57) ABSTRACT

The invention provides a pourable composition comprising calcium sulfate hemihydrate; optionally, cement; one or more anionic surfactants selected from alkyl anionic surfactants, alkyl ether anionic surfactants, alkyl aryl anionic surfactants, and combinations thereof; one or more set accelerator additives; and water.

16 Claims, No Drawings

(56) References Cited

OTHER PUBLICATIONS

Carl Roth GmbH & Co. KG, "Nekal® BX," Safety Data Sheet, Article No. 5240 (Rev. May 26, 2014).
USG Corporation, "Hydroperm® Metal Casting Plasters," Safety Data Sheet No. 52000000007 (Aug. 5, 2014).
Pilot Chemical Company, "Calsoft® F-90," Safety Data Sheet, Product Code 700000 (Rev. Apr. 16, 2015).
Procter & Gamble, "Ultra Ivory Liquid". Retrieved from the Internet at: <http://www.pg.com/productsafety/ingredients/household_care/dish_washing/Ivory/Ivory_Dish_Liquid.pdf>. (Jun. 2016).
Solvay S.A., "Rhodacal® BX-78 Surfactant," MatWeb Material Property Data. Retrieved from the Internet at: http://www.matweb.com/search/DataSheet.aspx?MatGUID=07d3359d3b5b4bb48962770ac15a154b. (Jun. 2016).
Procter & Gamble, "Ultra Ivory Original," Safety Data Sheet, Product Identifier 90878564_RET_NG (Rev. Oct. 3, 2016).

\* cited by examiner

POURABLE COMPOSITIONS

CROSS REFERENCE TO RELATED APPLICATION

This application claims the benefit under 35 U.S.C. § 119(e) of U.S. provisional patent application Ser. No. 62/347,045, filed Jun. 7, 2016, the entire disclosure of which is incorporated herein by reference.

FIELD OF INVENTION

This invention provides pourable compositions and methods for construction of faux construction and decorative items such as faux doors, faux wall panels, faux concrete walls, faux bricks, faux rocks, faux flooring, and the like with the items having a low crush strength and/or low density. Methods for making such compositions are also provided. Items made using the compositions of the invention are particularly suitable for use as prop items.

BACKGROUND OF INVENTION

Pourable compositions known in the art comprise powdered cement and/or gypsum based material, silica sand and/or other types of mineral fillers and water. These materials are either bucket mixed or mechanically mixed. The resultant slurries are poured into forms or cavities or pumped on to various substrates.

Such poured products, when intended for conventional use generally have to meet certain requirements for compressive strength, which can be achieved with conventional cementitious compositions, calcium sulfate hemi-hydrate compositions, or combination compositions containing both cement and calcium sulfate hemi-hydrate, optionally in further combination with a mineral filler, but such conventional compositions typically provide heavy products and can take several days to set and dry.

Various faux construction and decorative products including faux doors, faux wall panels, faux concrete walls, faux bricks, faux rocks, faux flooring, and the like are used on television, stage, and movie sets as prop items to further the action. It is desirable to be able to make these items quickly on site and for the items to be easily movable to facilitate set construction and take down. As a result, conventional pourable compositions cannot be used to make such faux construction items.

DETAILED DESCRIPTION

Pourable compositions according to the invention are advantageously capable of setting relatively quickly and retaining a desired form/shape, while also producing poured products exhibiting a low crush strength and/or a low density (and thus weight) at least relative to prior art pourable compositions containing cement, calcium sulfate hemi-hydrate, or combinations thereof. Items made using the compositions of the invention are particularly suitable for use as prop items on television, stage, and movie sets to further the action. Because of their low crush strength, items made using the compositions of the invention can be used, for example, in action movies where breakaway faux walls, breakaway faux floors, breakaway faux ceilings, and the like are desired. Of course, other items including faux benches, faux rocks, faux garage doors, and the like can also be made.

One embodiment according to the invention provides a pourable composition comprising calcium sulfate hemihydrate; cement; one or more anionic surfactants selected from alkyl anionic surfactants, alkyl ether anionic surfactants, alkyl aryl anionic surfactants, and combinations thereof; one or more set accelerator additives; and water. In another embodiment according to the invention, a pourable composition comprises calcium sulfate hemihydrate; one or more anionic surfactants selected from alkyl anionic surfactants, alkyl ether anionic surfactants, alkyl aryl anionic surfactants, and combinations thereof; one or more set accelerator additives; and water.

Different forms of calcium sulfate hemihydrate are suitable including but not limited to calcium sulfate hemihydrate obtained by calcining calcium sulfate dihydrate, synthetic calcium sulfate hemihydrate, chemically modified calcium sulfate hemihydrate, calcium sulfate α-hemihydrate, calcium sulfate β-hemihydrate, and combinations thereof.

Various types of cement can be used including but not limited to Portland cement. Various grades of Portland cement can be used, for example, such as: Class C Portland cement (similar to ASTM Spec. C150, Type 1), Class B Portland cement (similar to ASTM Spec. C150, Type II), and Type V Portland cement. Other suitable cements include but are not limited to calcium sulfo-aluminate cement, magnesium based cement, calcium aluminate cement, and mixtures thereof. At least in some embodiments, cement is cooked and/or ground cement.

In one embodiment, the calcium sulfate hemihydrate and the cement is provided in combination by using a metal casting plaster such as those available under the HYDROPERM® trade name (United States Gypsum Company, IL) including but not limited to HYDROPERM® permeable metal casting plaster-74 and HYDROPERM® LEM. Other metal casting plasters containing both calcium sulfate hemihydrate and cement may also be used. HYDROPERM® permeable metal casting plaster can include an anionic surfactant selected from alkyl anionic surfactants, alkyl ether anionic surfactants, alkyl aryl anionic surfactants and combinations in an amount between 0 and 0.1 wt. % (based on the weight of the HYDROPERM®). HYDROPERM® permeable metal casting plaster also can include a set accelerator additive but it is an insufficient amount to achieve a pourable composition according to the disclosure that demonstrates desirable properties to provide prop items to further the action as described herein. For example, articles formed with HYDROPERM® permeable metal casting plaster generally have compressive strength values exceeding 200 psi.

Anionic surfactants contain anionic functional groups at their head, such as sulfate, sulfonate, phosphate, and carboxylates. Exemplary anionic surfactants for use in the pourable compositions according to the disclosure include alkyl anionic surfactants, alkyl ether anionic surfactants, alkyl aryl anionic surfactants and combinations as mentioned above. Both liquid form and powdered form surfactants can be used. For example, suitable alkyl anionic surfactants may include but are not limited to C8-C16 alkyl sulfates and suitable alkyl ether (ethoxylated) anionic surfactants may include but are not limited to C8-C16 alkyl ether sulfates. Suitable alkyl aryl anionic surfactants include but are not limited to C8-C16 alkyl benzene sulfonates. Combinations of C8-C16 alkyl sulfates, C8-C16 alkyl ether sulfates, and C8-C16 alkyl benzene sulfonates may also be used. Particularly suitable anionic surfactants include sodium laureth sulfate and sodium lauryl sulfate and a mixture thereof. Other useful surfactants include sodium dodecyl benzene sulfonate. Exemplary surfactants include surfactants available under the IVORY® trade name (Procter & Gamble Inc., OH) such as Ultra Ivory Original, surfactants such as VARIMAX™ HS:320 (Vermillion LLC and Associates, TN), and surfactants available under the CALSOFT® trade name (Pilot Chemical Company, OH) such as CALSOFT® F-90, CALSOFT® F-90D, CALSOFT® L-40 and the like. Typically, the pourable compositions according to the disclosure include between 0.025 wt. % and 0.65 wt. %, between 0.025 wt. % and 0.5 wt. %, and/or between 0.2 wt. % and 0.5 wt. % of alkyl anionic surfactants, alkyl ether anionic surfactants, or combination thereof. The amount of alkyl anionic surfactants, alkyl ether anionic surfactants, or combination thereof is important for providing desired properties to items made using the compositions of the invention. For example, if too much alkyl anionic surfactant, alkyl ether anionic surfactant, or combination thereof is used, the set time will unacceptably be increased and items "formed" with the pourable compositions according to the disclosure will not hold their structure. On the other hand, if too little is used, items formed with the pourable compositions according to the disclosure will not have sufficiently low crush strength to be useful as prop items on television, stage, and movie sets.

Suitable cement retarder additives that retard a setting time of the hydratable cement phase of the pourable compositions according to the disclosure include, but are not limited to, organic compounds such as hydroxylated carboxylic acids and sugars. Organic acids such as citric acid, tartaric acid, malic acid, gluconic acid, succinic acid, glycolic acid, malonic acid, butyric acid, fumaric acid, formic acid, glutamic acid, pentanoic acid, glutaric acid, tartronic acid, mucic acid, trihydroxy benzoic acid, etc. may also be useful as cement retarder additives. Salts of organic acids such as sodium citrate, potassium citrate, sodium tartrate, potassium tartrate, sodium gluconate may also be used as cement retarder additives in some embodiments. Combinations of the foregoing cement retarder additives may also be used.

Suitable set accelerator additives that accelerate a setting time of the pourable compositions according to the disclosure include but are not limited to sodium carbonate, potassium carbonate, calcium nitrate, calcium nitrite, calcium formate, calcium acetate, calcium chloride, lithium carbonate, lithium nitrate, lithium nitrite, aluminum sulfate, potassium sulfate, sodium aluminate, alkanolamines, and polyphosphates. Terra alba, also known as calcium sulfate dehydrate, can also be used as a set accelerator additive. Particularly suitable set accelerator additives include calcium sulfate dihydrates also known as Climate Stabilized Accelerators (CSA) and Heat Resistant Accelerators (HRA), including the CSAs and HRAs disclosed in U.S. Pat. No. 7,718,019, hereby incorporated in its entirety herein by reference. Combinations of the foregoing set accelerator additives may also be used. Typically, the pourable compositions according to the disclosure include between 0.10 wt. %-1.0 wt. %, 0.125 wt. %-1.0 wt. %, 0.15 wt. %-1.0 wt. %, and/or 0.35 wt. %-0.8 wt. % of set accelerator additive(s). The amount of set accelerator additive(s) is important for providing desired properties to items made using the pourable compositions of the invention. For example, the high levels of set accelerator additive used in the pourable compositions according to the disclosure allow for some initial hydration during soaking and/or mixing which helps to provide a lower crush strength. Therefore, too little set accelerator additive can result in crush strength values that are too high. On the other hand, amounts of set accelerator that are too high, the pourable composition according to the disclosure can actually "prill" in the mixing vessel and not set into a hard formed structure. Indeed, the pourable composition may "prill" to the point that it actually pours out as a dust-like particulate from the vessel.

The pourable compositions according to the invention may further comprise one or more nonionic or amphoteric surfactants. Suitable nonionic or amphoteric surfactants include amine oxides, for example, alkyl dimethyl amine oxide such as C10-C18-alkyldimethyl-N-oxides. At least in some embodiments, the composition comprises sodium laureth sulfate, sodium lauryl sulfate, and alkyl dimethyl amine oxide.

The pourable compositions according to the invention may further comprise one or more alkyl aromatic sulfonate foaming agents such as alkyl benzene sulfonates, alkyl naphthalene sulfonates, and combinations thereof. Sodium C10-C16 alkyl benzene sulfonates and sodium dibutyl naphthalene sulfonates are representative species of alkyl aromatic sulfonate foaming agents that may be used.

The pourable compositions according to the invention may also further comprise one or more polyaromatic sulfonate foaming agents such as polystyrene sulfonates, polynapthalene sulfonates, and combinations thereof.

The pourable compositions according to the invention may further comprise one or more mineral fillers such as talc, perlite, vermiculite, calcium carbonate, silica sand. Mineral fillers are not reactive with any other components and do not provide structural strength to a product formed from the pourable compositions according to the disclosure.

In some embodiments, a pourable composition according to the invention may comprise between about 30 weight percent (wt. %) to about 49 wt. % calcium sulfate hemihydrate; between about 0.175 wt. % to about 0.75 wt. % cement; between 0.025 wt. % to about 0.5 wt. % of one or more anionic surfactants selected from alkyl anionic surfactants, alkyl ether anionic surfactants, and combinations thereof; and between about 0.125 wt. % to about 1.0 wt. % of one or more set accelerator additives; with the balance of the composition being water.

Generally, the pourable compositions according to the invention include water in an amount between 30 wt. % and 60 wt. %, between 35 wt. % and 55 wt. %, and/or between 40 wt. % and 52.5 wt. %. If the amount of water is too high, the pourable composition can provide a slurry which does not set, is very slow to dry/set, or does not develop sufficient strength upon setting can result. On the other hand, if the amount of water is too low, the pourable composition can provide a slurry which when hardened can be too dense and/or have too high crush strength for the intended use.

Suitable densities for the pourable compositions according to the disclosure are 20-50 lbs/cubic foot, 20-45 lbs/cubic foot, and/or 25-40 lbs/cubic foot. Articles formed using the pourable compositions according to the disclosure generally have densities between 10-35 lbs/cubic foot, 12-25 lbs/cubic foot, and/or 15-22 lbs/cubic foot. Suitable compressive strengths for the pourable compositions according to the disclosure are 0-70 lbs/cubic foot, 10-60 lbs/cubic foot, and/or 20-50 lbs/cubic foot. Articles formed using the pourable compositions according to the disclosure generally have compressive strengths between 15-150 lbs/inch (psi), 17-100 psi, and/or 20-80 psi demonstrating their ease of crushing. Suitable hardness values for the pourable compositions according to the disclosure as determined using an Asker Durometer Type C are 2-70 Asker C units, 5-40 Asker C units, and/or 10-35 Askers C units. Articles formed using the pourable compositions according to the disclosure generally have hardness values between 4-80 Asker C units, 10-50 Asker C units, and/or 15-60 Asker C units. Such hardness values are generally not considered to be suitable for "true" structural applications, but are advantageous for providing prop items on television, stage, and movie sets to further the action.

A method of making a poured product comprises pouring a composition according to the disclosure into a cast, a mold, or on to a surface; allowing the poured composition to set; thereby obtaining the poured product.

A representative pourable composition according to the disclosure follows:

| Raw Material | Range(s) |
| --- | --- |
| Calcium sulfate hemihydrate | 30 wt. %-65 wt. %, and/or<br>30 wt. %- 49 wt. % |
| Cement | 0 wt. %-10 wt. %,<br>0 wt. %-5 wt. %, and/or<br>0.175 wt. %-0.75 wt. % |
| Set accelerator additive | 0.10 wt. %-1.0 wt. %,<br>0.125 wt. %-1.0 wt. %,<br>0.15 wt. %-1.0 wt. %, and/or<br>0.35 wt. %-0.8 wt. % | herein. This is done merely for convenience and to give a general sense of the description. This description, and the claims that follow, should be read to include one or at least one, and the singular also includes the plural unless it is clear that it is meant otherwise.

Although the foregoing text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Example 1

A pourable composition according to the disclosure was obtained as follows.

| Raw Material | Description | Quantity (original units) | Quantity (grams) | WEIGHT % (%) |
| --- | --- | --- | --- | --- |
| HYDROPERM® (United States Gypsum Company, IL) | Metal Casting Plaster | 2 pounds | 908 grams | 49.50% |
| Water | Water | 2 pounds | 908 grams | 49.50% |
| C.S.A. (United States Gypsum Company, IL) | Gypsum based set accelerator additive | 1 tablespoon | 11.35 grams | 0.62% |
| Ultra IVORY® liquid soap | Alkyl anionic surfactant/ alkyl ether anionic surfactant source | 0.5 tablespoon | 7 grams | 0.38% (about 0.05% anionic surfactant) |
| TOTAL | | | 1834.35 grams | 100% |

-continued

| Raw Material | Range(s) |
| --- | --- |
| Mineral filler (optional) | 0 wt. %-15 wt. % |
| Cement retarder additive (optional) | 0 wt. %-.075 wt. % |
| Anionic surfactant(s) | 0.025 wt. %-0.65 wt. %,<br>0.025 wt. %-0.5 wt. %, and/or<br>0.2 wt. %-0.5 wt. % |
| Water | Q.S.; generally, 30 wt. %-60 wt. %,<br>35 wt. %-55 wt. %, and/or<br>40 wt. %-52.5 wt. % |

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In addition, use of the "a" or "an" are employed to describe elements and components of the embodiments 2 lbs of water was placed in a clean bucket. A couple of ounces of water was removed from the bucket and placed into a small cup. One-half of a tablespoon of Ultra IVORY® liquid soap was added to the small cup of water and stirred gently with a spoon.

2 lbs of HYDROPERM® was weighed into a vessel and 1 tablespoon of CSA was placed on top. The dry ingredients were poured into the bucket of water.

The ingredients were mixed with a rubber ended mixing paddle attached to a drill for about 30-45 seconds. The small cup of water with IVORY® liquid soap was added to the bucket. The ingredients were then mixed for another 30-45 seconds.

The obtained composition was then poured into a mold. The composition set in 5-10 minutes. Longer set times can be obtained by decreasing both mix times to 30 seconds on both mixes.

The obtained composition which when poured into a mold exhibited a wet density of 33-38 lbs/cubic foot and a dry density of 20-30 lbs/cubic foot. Heavier densities can be obtained by decreasing both mix times to 30 seconds (on both mixes).

The obtained composition was then poured into brass cubes molds, removed when firm, and then dried to provide a formed piece which (when crushed on a compressive strength machine) yielded compressive strengths in the range of 20-70 psi, demonstrating their ease of crushing.

The same cubes when tested with an ASKER C DUROMETER yield surface hardness of 40-60 Asker C units.

Example 2

While following the procedures described in Example 1, a pourable composition according to the disclosure was obtained as follows.

| Raw Material | Description | WEIGHT (grams) | WEIGHT % (%) |
|---|---|---|---|
| HYDROCAL C-Base (United States Gypsum Company, IL) | Alpha calcium sulfate hemi-hydrate | 200 grams | 64.82% |
| Water | Water | 100 grams | 32.41% |
| C.S.A. (United States Gypsum Company, IL) | Gypsum based set accelerator additive | 0.5 grams | 0.16% |
| Ultra Ivory | See SDS | 8 grams | 2.59% (about 0.35% anionic surfactant). |
| TOTAL | | 308.5 grams | 100% |

| Wet Density (#/ft3) | Asker C DUROMETER Wet (Asker C Units) | Dry Density (#/ft3) | Asker C DUROMETER Dry (Asker C Units) |
|---|---|---|---|
| 41.1-41.7 | 24 | 32.2-32.52 | 67-77 |

The embodiment demonstrates a pourable composition which provides a fast setting (less than 30 minutes) and fast forming faux construction and/or decorative item which can be handled and demolded in 60 minutes. Compositions that provide for fast forming and fast demolding items with smooth surfaces and/or are light weight are particularly useful compositions.

What is claimed is:

1. A poured article formed using a pourable composition comprising between about 30 weight percent (wt. %) to 49 wt. % calcium sulfate hemihydrate; optionally, between about 0 wt. % to about 10.0 wt. % cement; between about 0.025 wt. % to about 0.65 wt. % of one or more anionic surfactants selected from alkyl anionic surfactants, alkyl ether anionic surfactants, alkyl aryl anionic surfactants, and combinations thereof; and between 40 wt. % and 60 wt. % water wherein the formed article has a compressive strength between 17-100 psi and a hardness value between 10-60 Asker C units.

2. The poured article according to claim 1 wherein the calcium sulfate hemihydrate comprises calcium sulfate hemihydrate obtained by calcining calcium sulfate dehydrate, synthetic calcium sulfate hemihydrate, chemically modified calcium sulfate hemihydrate, calcium sulfate α-hemihydrate, calcium sulfate β-hemihydrate, or a combination thereof.

3. The poured article according to claim 1 wherein the cement comprises Portland cement.

4. The poured article according to claim 3 wherein the Portland cement is Class C Portland cement, Class B Portland cement, or Type V Portland cement.

5. The poured article according to claim 3 wherein the Portland cement is Class C Portland cement.

6. The poured article according to claim 1 wherein the cement comprises Portland cement, calcium sulfo-aluminate cement, magnesium based cement, calcium aluminate cement, or a mixture thereof.

7. The poured article according to claim 1, wherein the anionic surfactant comprises at least an alkyl-aryl anionic surfactant.

8. The poured article according to claim 1, wherein the anionic surfactant is a C8-C16 alkyl sulfate, a C8-C16 alkyl ether sulfate, a C8-C16 alkyl benzene sulfonate, or a combination thereof.

9. The poured article according to claim 1, wherein the anionic surfactant is sodium laureth sulfate, sodium lauryl sulfate, or a mixture thereof.

10. The poured article according to claim 1, further comprising a cement retarder additive.

11. The poured article according to claim 10, wherein the cement retarder additive comprises an organic compound, an organic acid, a salt of an organic acid, or a combination thereof.

12. The poured article according to claim 1, further comprising between about 0.1 wt. % to about 1.0 wt. % of a set accelerator additive.

13. The poured article according to claim 12, wherein the set accelerator additive comprises sodium carbonate, potassium carbonate, calcium nitrate, calcium nitrite, calcium formate, calcium acetate, calcium chloride, lithium carbonate, lithium nitrate, lithium nitrite, aluminum sulfate, potassium sulfate, sodium aluminate, alkanolamines, polyphosphates, terra alba, Climate Stabilized Accelerators (CSA), Heat Resistant Accelerators (HRA), or a combination thereof.

14. The poured article according to claim 1, further comprising a nonionic or amphoteric surfactant.

15. The poured article according to claim 14, wherein the nonionic or amphoteric surfactant comprises an amine oxide.

16. A method of making a poured article comprising pouring a composition comprising between about 30 wt. % to 49 wt. % calcium sulfate hemihydrate; optionally, between about 0 wt. % to about 10.0 wt. % cement; between about 0.025 wt. % to about 0.65 wt. % of one or more anionic surfactants selected from alkyl anionic surfactants, alkyl ether anionic surfactants, alkyl aryl anionic surfactants, and combinations thereof; and between 40 wt. % and 60 wt. % water into a cast, a mold, or on to a surface; and allowing the poured composition to set, thereby making the poured article wherein the poured article has a compressive strength between 17-100 psi and a hardness value between 10-60 Asker C units.

* * * * *